(12) United States Patent
Kaneko

(10) Patent No.: US 6,647,859 B2
(45) Date of Patent: Nov. 18, 2003

(54) BELT-FIXING MECHANISM

(75) Inventor: Junya Kaneko, Abiko (JP)

(73) Assignee: SMC Kabushiki Kaisha, Tokyo (JP)

( * ) Notice: Subject to any disclaimer, the term of this patent is extended or adjusted under 35 U.S.C. 154(b) by 35 days.

(21) Appl. No.: 10/131,093

(22) Filed: Apr. 25, 2002

(65) Prior Publication Data

US 2002/0157923 A1 Oct. 31, 2002

(30) Foreign Application Priority Data

Apr. 25, 2001 (JP) ........................................ 2001-128361

(51) Int. Cl.[7] .............................................. F01B 29/00
(52) U.S. Cl. ............................................................ 92/88
(58) Field of Search ........................ 92/88, 137, 13.41, 92/13.5, 13.7

(56) References Cited

U.S. PATENT DOCUMENTS

| | | | | |
|---|---|---|---|---|
| 4,555,980 A | * | 12/1985 | Hoglund ........................ | 92/88 |
| 5,606,903 A | * | 3/1997 | Drittel ........................... | 92/88 |
| 5,724,880 A | * | 3/1998 | Noda ............................ | 92/88 |
| 5,950,773 A | * | 9/1999 | Ito ................................ | 188/67 |
| 6,098,522 A | * | 8/2000 | Granberg ...................... | 92/88 |

OTHER PUBLICATIONS

U.S. patent application Ser. No. 10/131,092, filed on Apr. 25, 2002, status pending.

* cited by examiner

*Primary Examiner*—Edward K. Look
*Assistant Examiner*—Igor Kershteyn
(74) *Attorney, Agent, or Firm*—Paul A. Guss

(57) ABSTRACT

First and second adjusting screws are screwed into screw holes of an end plate respectively. An upper belt is interposed between the second adjusting screw and a fixing member. Either one or both of the first adjusting screw and the second adjusting screw are rotated to move the fixed height position of the upper belt under the swinging action about the support point on a lower circular arc-shaped section of the fixing member.

10 Claims, 7 Drawing Sheets

BELT-FIXING MECHANISM

BACKGROUND OF THE INVENTION

1. Field of the Invention

The present invention relates to a belt-fixing mechanism. Specifically, the present invention relates to a belt-fixing mechanism for fixing an end of a belt which seals a slit of a drive apparatus or the like.

2. Description of the Related Art

The fluid pressure-driven apparatus such as a rodless cylinder is used as a means for transporting a workpiece. The rodless cylinder has a belt-fixing mechanism for fixing a seal belt (upper belt). The seal belt prevents dust or the like from entering externally through a slit.

In the belt-fixing mechanism, a fixing member is pressed against the seal belt formed of a metal material so that the seal belt may be fixed by the frictional force.

In the conventional belt-fixing mechanism for the rodless cylinder used as a fluid pressure fluid-driven apparatus, both ends of the seal belt are interposed between the fixing members and fastening members which are connected to both ends of a cylinder tube respectively.

In the method of fixing the seal belt with the frictional force thereof, the fixing member is pressed against the inner surface of the fastening member for fixing the seal belt. Therefore, the positional accuracy of the height position of the fixed seal belt is low due to any dimensional error of each of the members such as the fastening member, the fixing member and the seal belt.

Further, there is a difference between the height position of the fixation plane for the seal belt on the fastening member and the height position of the laying plane for the seal belt on the upper surface of the cylinder tube. Therefore, the seal belt may be bent near the fastening member and may float over the laying plane for the seal belt. Accordingly, the dust or the like may enter through a clearance between the seal belt and the laying plane.

Further, if the seal belt floats over the laying plane in the conventional rodless cylinder, the fastening members, the fixing members and the seal belt are disassembled to perform the adjustment operation and are assembled again, which is complicated to result in the low operation efficiency.

SUMMARY OF THE INVENTION

It is therefore a general object of the present invention to provide a belt-fixing mechanism which conveniently adjusts a height position of a belt for avoiding any influence of dimensional error of each of peripheral members including the belt.

A principal object of the present invention is to provide a belt-fixing mechanism which avoids any dimensional error of each of peripheral members including a belt for further improving the sealing performance of the belt.

Another object of the present invention is to provide a belt-fixing mechanism which avoids any complicated adjustment operation for improving the assembling operability and the operation efficiency.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
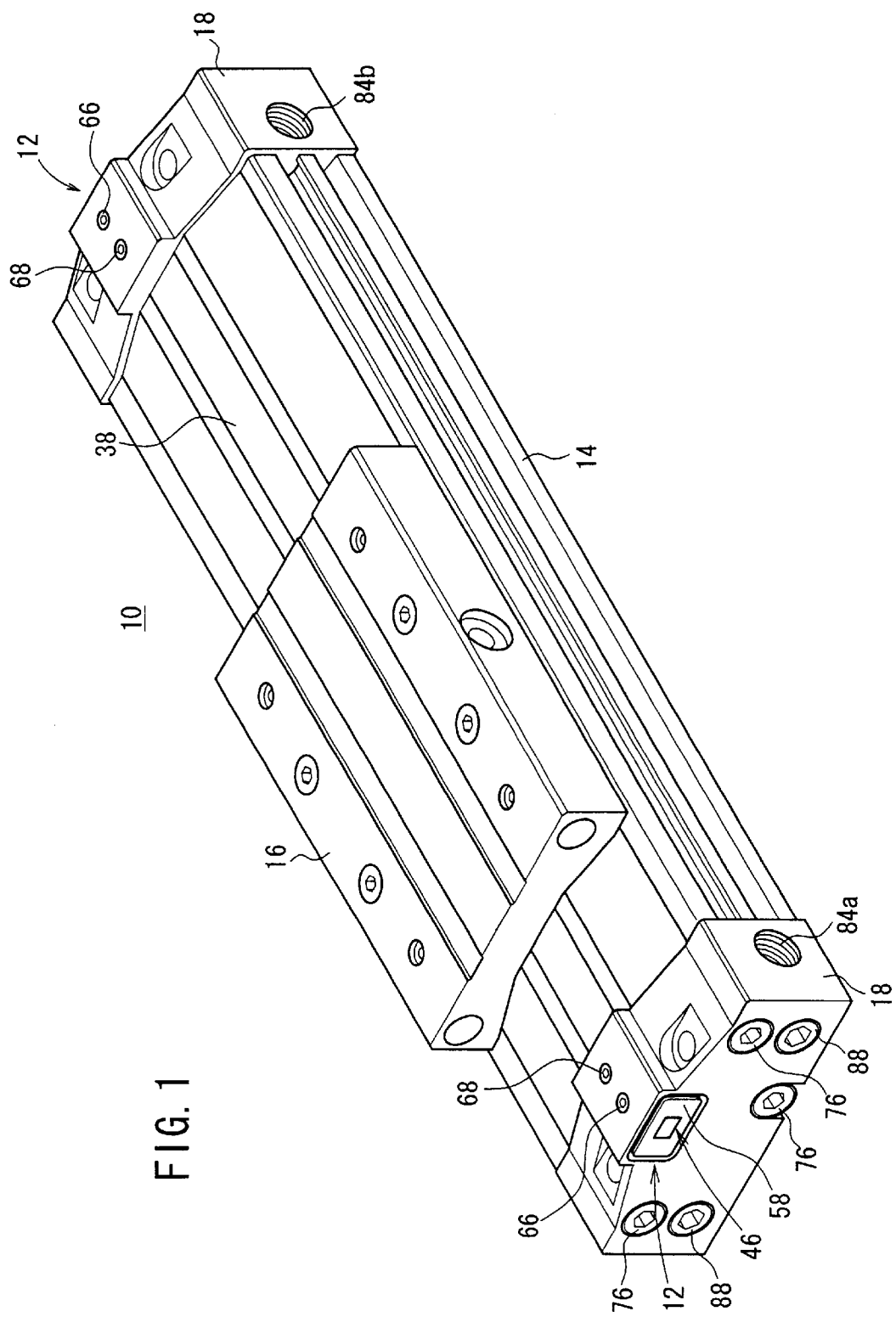
FIG. 1 is a perspective view illustrating a rodless cylinder incorporating a belt-fixing mechanism according to an embodiment of the present invention.

In FIG. 1, a rodless cylinder 10 incorporates a belt-fixing mechanism 12 according to an embodiment of the present invention.

The rodless cylinder 10 comprises a cylinder tube 14, a slide table 16, a pair of end plates (fastening members) 18 and belt-fixing mechanisms 12. The slide table 16 is attached onto the upper surface of the cylinder tube 14 and moves longitudinally. The pair of end plates 18 are attached to both ends of the cylinder tube 14. The belt-fixing mechanisms 12 are disposed in the respective end plates 18. Each of the belt-fixing mechanisms 12 has the same construction.

Figure 2:
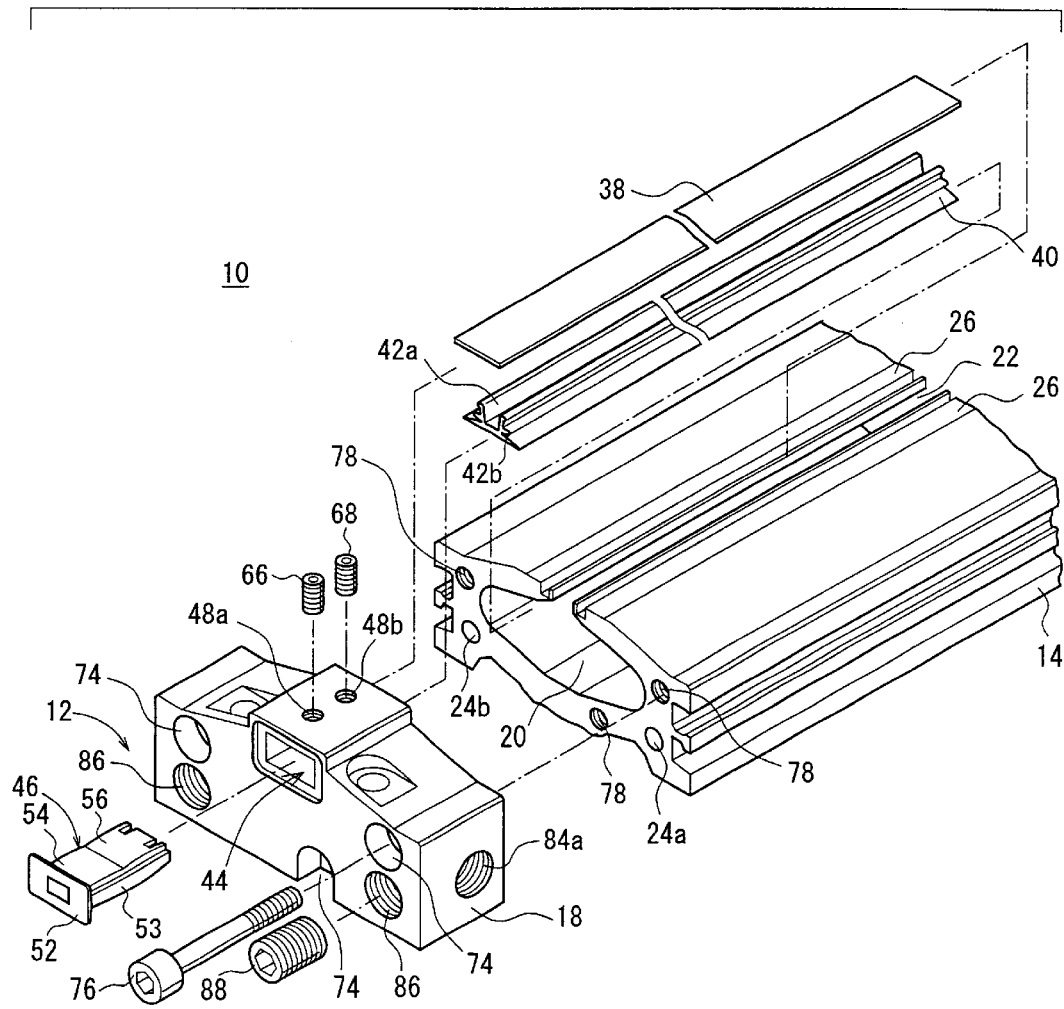
FIG. 2 is, with partial omission, an exploded perspective view illustrating the rodless cylinder.

As shown in FIG. 2, a bore 20 is formed longitudinally in the cylinder tube 14 and has a substantially rhombic cross section. A slit 22 is formed longitudinally through the upper surface of the cylinder tube 14. The bore 20 communicates externally through the slit 22. Axially extending fluid bypass passages 24a, 24b for centralized piping are formed near both lower sides of the bore 20 in the cylinder tube 14.

A pair of belt abutment planes 26 are formed on both sides of the slit 22. The slit 22 is located between the pair of belt abutment planes 26 on the upper surface of the cylinder tube 14. An upper belt (belt) 38 abuts against the pair of belt abutment planes 26. Magnets are installed to the belt abutment planes 26 in order to tightly contact the upper belt 38.

Figure 3:
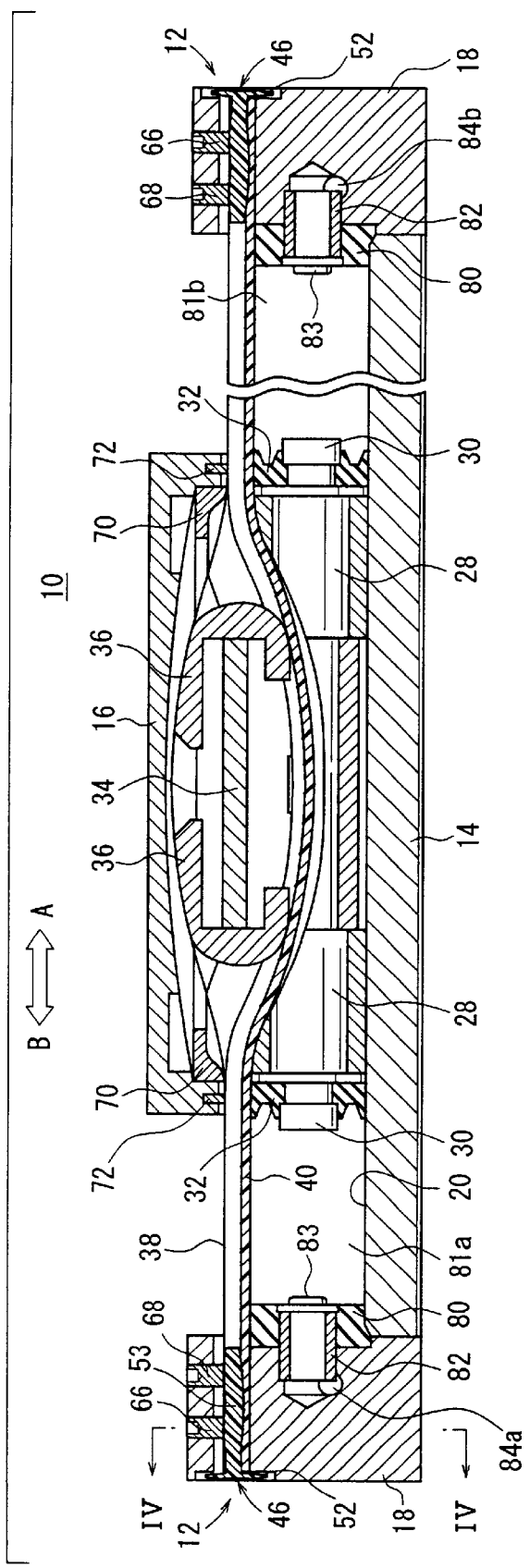
FIG. 3 is a longitudinal sectional view taken along the axial direction of the rodless cylinder.

As shown in FIG. 3, a piston 28 is inserted movably back and forth into the bore 20 of the cylinder tube 14. The cross sectional shape of the piston 28 corresponds to the bore 20.

Projections 30 are formed at both longitudinal ends of the piston 28. A seal 32 is attached to the projection 30. The seal 32 contacts and seals the inner wall surface of the bore 20.

A piston yoke 34 which protrudes upwardly is installed to the piston 28. A pair of belt separators 36 are attached to both upper ends of the piston yoke 34. The slide table 16 is connected to the piston 28 so that the piston yoke 34 and the belt separators 36 may be covered with the slide table 16.

Figure 4:
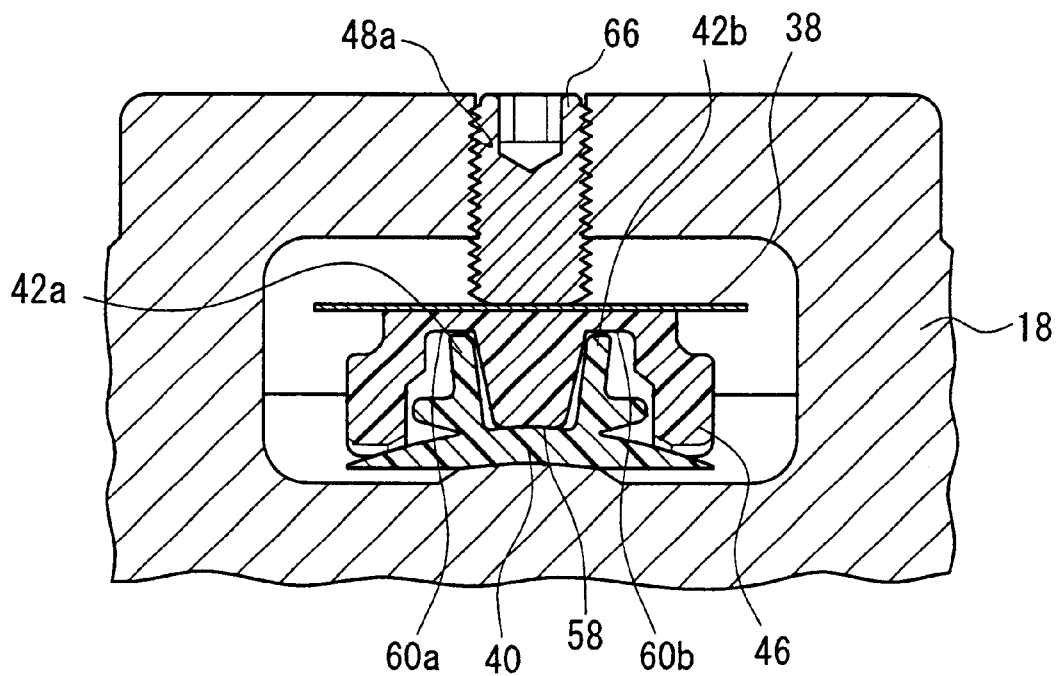
FIG. 4 is, with partial omission, a vertical sectional view taken along a line IV—IV shown in FIG. 3.

As shown in FIGS. 2 and 3, the upper belt 38 and a lower belt 40 are attached to the slit 22 of the cylinder tube 14 for vertically closing the slit 22. The upper belt 38 is made of, for example, a metal material and is of a narrow band shape. The lower belt 40 is made of, for example, a resin material. As shown in FIG. 4, a pair of lips 42a, 42b are disposed on the upper surface of the lower belt 40.

As shown in FIGS. 2 and 3, each of the belt-fixing mechanisms 12 comprises a fixing member 46 and first and second adjusting screws (fixation position-adjusting members) 66, 68. The fixing member 46 is inserted into an engaging hole 44 having a rectangular cross section formed through the end plate 18. The first and second adjusting screws 66, 68 are screwed into screw holes 48a, 48b formed through the upper surface of the end plate 18 respectively.

Figure 5:
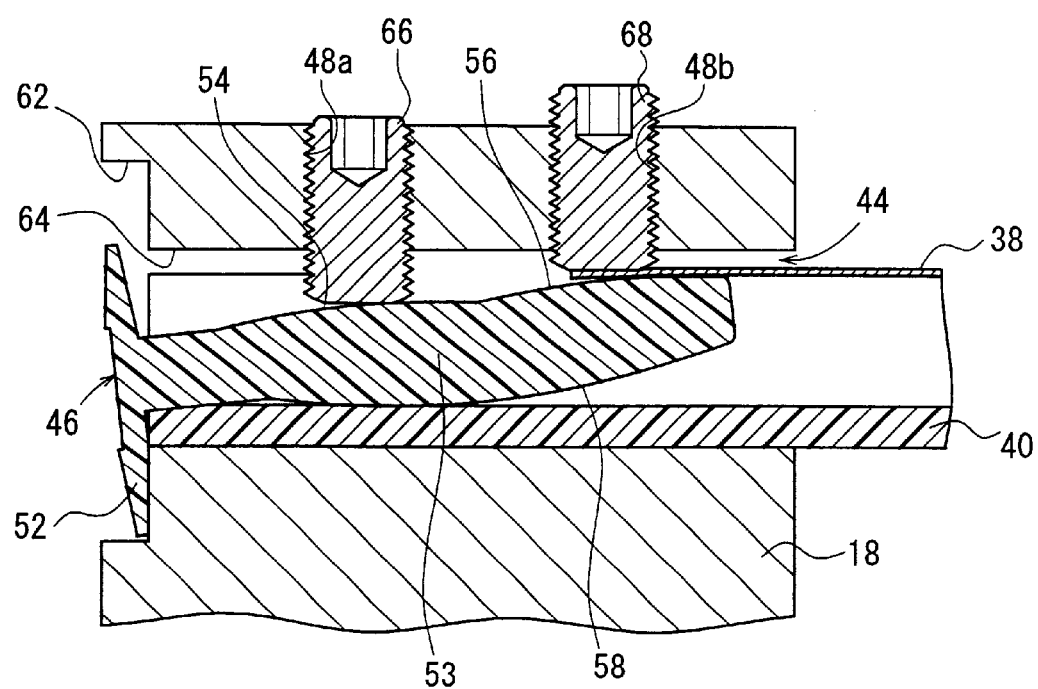
FIG. 5 is a partial magnified longitudinal sectional view illustrating an upwardly adjusted upper belt which is disposed near a fixing member of the rodless cylinder.
Figure 6:
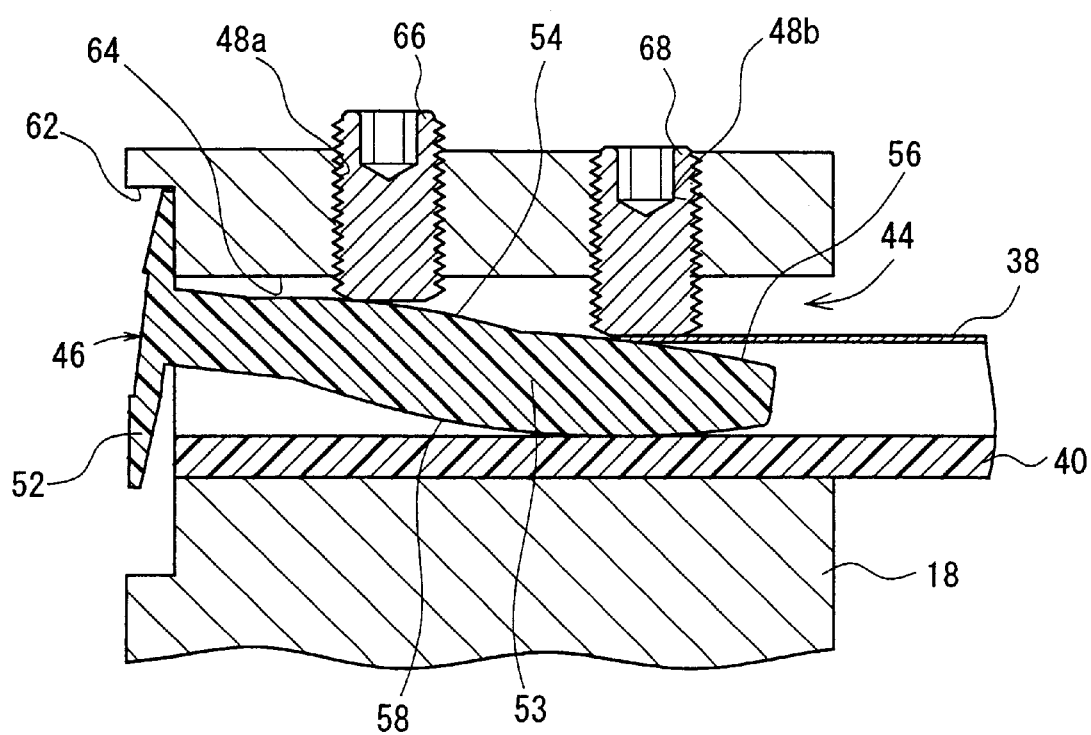
FIG. 6 is a partial magnified longitudinal sectional view illustrating the downwardly adjusted upper belt which is disposed near the fixing member of the rodless cylinder.
Figure 7:
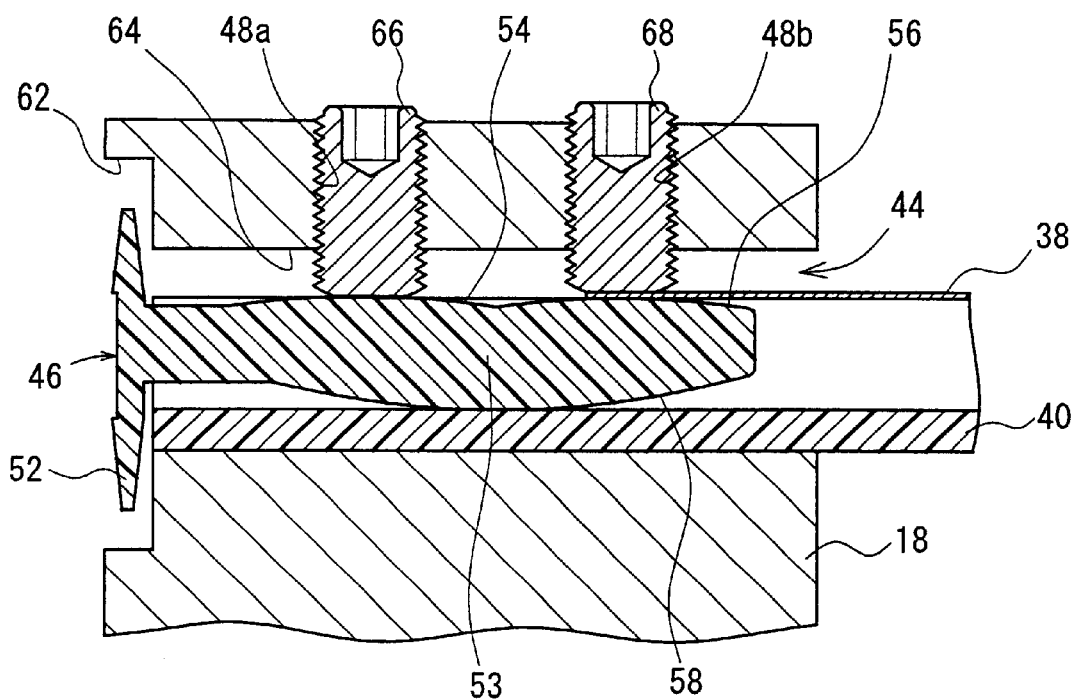
FIG. 7 is a partial magnified longitudinal sectional view illustrating a state in which the height position of the upper belt disposed near the fixing member of the rodless cylinder is adjusted to an intermediate position.

As shown in FIGS. 5 to 7, a cross section of the fixing member 46 is of a substantially T shape. The fixing member 46 integrally comprises a flange 52 and a projection 53. The projection 53 protrudes substantially perpendicular to the flat surface of the flange 52.

A first upper circular arc-shaped section 54 (first circular arc-shaped section) and a second upper circular arc-shaped section 56 (first circular arc-shaped section) are disposed on the upper surface of the projection 53. Each of the first upper circular arc-shaped section 54 and the second upper circular arc-shaped section 56 has the same radius of curvature and is longitudinally continuous. A lower circular arc-shaped section 58 (second circular arc-shaped section), which is a single circular arc having a radius of curvature larger than that of the first and second upper circular arc-shaped sections 54, 56, is disposed on the lower surface of the projection 53 corresponding to the first and second upper circular arc-shaped sections 54, 56. In the embodiment of the present invention, it is assumed that the upper circular arc-shaped section near the flange 52 is referred to as "first upper circular arc-shaped section 54".

As shown in FIG. 4, a pair of engaging grooves 60a, 60b are formed to the lower circular arc-shaped section 58 of the fixing member 46. The pair of engaging grooves 60a, 60b have a cross section of a substantially M shape. The lips 42a, 42b of the lower belt 40 engage with the engaging grooves 60a, 60b. The bottom surface of the lower circular arc-shaped section 58 presses the center and both ends of the lower belt 40. Thus, the lower belt 40 is fixed.

As shown in FIGS. 5 to 7, the engaging hole 44 has a first opening 62 and a second opening 64. The first opening 62 has a substantially oblong cross section at one end surface of the end plate 18. The second opening 64 is slightly smaller than the first opening 62 at a position where it is slightly recessed from the first opening 62. Therefore, there is a step between the first opening 62 and the second opening 64.

The flange 52 of the fixing member 46 engages with the step for closing the second opening 64. Further, the first and second upper circular arc-shaped sections 54, 56 and the lower circular arc-shaped section 58 of the fixing member 46 are inserted into the second opening 64.

The screw holes 48a, 48b are spaced from each other by a predetermined distance substantially centrally on the upper surface of the end plate 18. The screw holes 48a, 48b penetrate into the engaging hole 44 from the upper surface of the end plate 18.

Further, the first and second adjusting screws 66, 68 are adjustably screwed in the screw holes 48a, 48b respectively by an unillustrated tool. The lower end of the first adjusting screw 66 abuts against the first upper circular arc-shaped section 54 of the fixing member 46. The lower end of the second adjusting screw 68 abuts against the second upper circular arc-shaped section 56 of the fixing member 46. The end of the upper belt 38 is fixedly interposed between the lower end of the second adjusting screw 68 and the second upper circular arc-shaped section 56.

The first adjusting screw 66 is rotated to move downwardly under the tightening action of the unillustrated tool, and the second adjusting screw 68 is rotated to move upwardly. Then, the first upper circular arc-shaped section 54, which abuts against the first adjusting screw 66, moves downwardly, and the second upper circular arc-shaped section 56 moves upwardly under the swinging action about the support point on the contact surface between the lower circular arc-shaped section 58 and the lower belt 40 as shown in FIG. 5. Consequently, the upper belt 38 interposed between the lower end of the second adjusting screw 68 and the second upper circular arc-shaped section 56 moves upwardly together with the second upper circular arc-shaped section 56.

By contrast, the second adjusting screw 68 is rotated to move downwardly under the tightening action of the unillustrated tool, and the first adjusting screw 66 is rotated to move upwardly. Then, the second upper circular arc-shaped section 56, which abuts against the second adjusting screw 68, moves downwardly, and the first upper circular arc-shaped section 54 moves upwardly under the swinging action about the support point on the contact surface between the lower circular arc-shaped section 58 and the lower belt 40 as shown in FIG. 6. Consequently, the upper belt 38 interposed between the lower end of the second adjusting screw 68 and the second upper circular arc-shaped section 56 moves downwardly together with the second upper circular arc-shaped section 56.

As described above, the both ends of the upper belt 38 are fixed between the fixing members 46 and the second adjusting screws 68 respectively. The both ends of the lower belt 40 are fixed between the lower surfaces of the second openings 64 and the lower circular arc-shaped sections 58 respectively.

As shown in FIG. 3, the pair of belt separators 36 are interposed between the upper belt 38 and the lower belt 40 which are vertically spaced from each other. The upper belt 38 passes through the space between the belt separator 36 and the slide table 16. The lower belt 40 passes through the space between the belt separator 36 and the piston 28.

Holding members 70 are disposed at the both ends of the slide table 16. The upper belt 38 is pressed toward the cylinder tube 14 by the holding members 70.

Scrapers 72 are disposed at the both ends of the slide table 16. The scrapers 72 contact the upper belt 38, preventing dust or the like from entering into the space between the slide table 16 and the upper belt 38.

As shown in FIGS. 1 to 3, the end plates 18 are attached to the both ends of the cylinder tube 14 for closing the openings of the bore 20. As shown in FIGS. 1 and 2, a plurality of screw-installing holes 74 are formed through the end plate 18. Screws 76 are installed to screw holes 78 of the cylinder tube 14 through the screw-installing holes 74. Thus, the end plate 18 is assembled to the cylinder tube 14.

As shown in FIG. 3, a gasket 80 closes the space airtight between the end plate 18 and the bore 20. The gasket 80 is formed of, for example, a rubber material. Cylinder chambers 81a, 81b are formed between the piston 28 and the end plates 18 in the bore 20 respectively.

Hollow cylindrical members 82 are inserted through the substantial center of the gaskets 80 and are connected to the end plates 18. When the slide table 16 arrives at the displacement terminal end, the projection 30 of the piston 28 abuts against a damper 83 of the gasket 80 to stop.

As shown in FIG. 1, ports 84a, 84b are formed on the side surfaces of the pair of end plates 18 respectively. The ports 84a, 84b communicate with the cylinder chambers 81a, 81b in the cylinder tube 14 respectively through unillustrated passages in the end plates 18.

A pressure fluid supply source is connected to the ports 84a, 84b, for example, through an unillustrated directional control valve. The pressure fluid from the pressure fluid supply source is selectively supplied to the ports 84a, 84b respectively.

As shown in FIG. 2, outer ports 86 are formed on one end surface of the end plate 18. The outer port 86 communicates with the cylinder chamber 81a (81b) in the cylinder tube 14 through an unillustrated passage in the end plate 18 and the fluid bypass passage 24a, 24b. A sealing screw 88 engages with and contacts the outer port 86.

The rodless cylinder 10 incorporating the belt-fixing mechanism 12 according to the embodiment of the present invention is basically thus constructed. Next, its operation, function, and effect will be explained. At first, the method of assembling and adjusting the belt-fixing mechanism 12 will be explained.

As shown in FIG. 2, the end of the upper belt 38, the fixing member 46, and the end of the lower belt 40 are inserted into the second opening 64 of the engaging hole 44. The lips 42a, 42b of the lower belt 40 engage with the engaging grooves 60a, 60b formed under the fixing member 46 (see FIG. 4). Further, the first adjusting screw 66 and the second adjusting screw 68 are screwed in the screw holes 48a, 48b formed at the upper surface of the end plate 18.

Subsequently, the end of the upper belt 38 is fixedly interposed between the lower end of the second adjusting screw 68 and the second upper circular arc-shaped section 56 of the fixing member 46. When the lower end of the first adjusting screw 66 abuts against the first upper circular arc-shaped section 54 of the fixing member 46, the fixing member 46, the upper belt 38 and the lower belt 40 are fixed respectively (see FIG. 7).

The fixing member 46 fixes the plane of the upper belt 38. The height position of the plane of the upper belt 38 which is fixed by the fixing member 46 may be different from that of the upper belt 38 which is positioned on the belt abutment planes 26 of the upper surface of the cylinder tube 14. Then, if the plane of the upper belt 38 which is fixed by the fixing member 46 is higher than the belt abutment planes 26, the second adjusting screw 68 is tightened to move downwardly and the first adjusting screw 66 is loosened to move upwardly. Therefore, the upper belt 38 moves downwardly (see FIG. 6). Consequently, the height position of the plane of the upper belt 38 which is fixed by the fixing member 46 is desirably adjusted to be the same as that of the belt abutment planes 26.

By contrast, if the plane of the upper belt 38 which is fixed by the fixing member 46 is lower than the belt abutment planes 26, the first adjusting screw 66 is tightened to move downwardly and the second adjusting screw 68 is loosened to move upwardly. Therefore, the upper belt 38 moves upwardly (see FIG. 5). Consequently, the height position of the plane of the upper belt 38 which is fixed by the fixing member 46 is desirably adjusted to be the same as that of the belt abutment planes 26.

As described above, in the embodiment of the present invention, the upper belt 38 is interposed between the fixing member 46 and the second adjusting screw 68. Either one or both of the first adjusting screw 66 and the second adjusting screw 68 are adjustable. Therefore, the screwing amount is changeable for conveniently adjusting the height position of the fixed upper belt 38.

The rodless cylinder 10 incorporating the belt-fixing mechanism 12 thus assembled and adjusted is operated as follows. As shown in FIG. 3, the pressure fluid (for example, compressed air) supplied to one port 84a is introduced into the cylinder chamber 81a in the cylinder tube 14 through the unillustrated passage. When the piston 28 is pressed by the pressure fluid in the direction of the arrow A shown in FIG. 3, the slide table 16 moves in the direction of the arrow A together with the piston 28.

The holding member 70 has closed the upper belt 38 and the lower belt 40. As the slide table 16 moves as described above, however, the belt separator 36 opens the upper belt 38 and the lower belt 40 in the moving direction of the slide table 16.

When the slide table 16 further moves and the projection 30 of the piston 28 abuts against the damper 83 of the gasket 80, the slide table 16 stops.

By contrast, when the unillustrated directional control valve is switched to supply the pressure fluid to the port 84b, the pressure fluid is introduced into the cylinder chamber 81b in the cylinder tube 14 through the unillustrated passage. When the piston 28 is pressed by the pressure fluid in the direction of the arrow B shown in FIG. 3, the slide table 16 moves in the direction of the arrow B together with the piston 28.

Then, the operation opposite to the case in which the slide table 16 moves in the direction of the arrow A is performed. That is, the belt separator 36 opens the upper belt 38 and the lower belt 40 which have been closed by the holding member 70. Further, the holding member 70 closes the upper belt 38 and the lower belt 40 which have been opened by the belt separator 36.

The slide table 16 stops when the slide table 16 arrives at the displacement terminal end of the cylinder tube 14 and the projection 30 of the piston 28 abuts against the damper 83 of the gasket 80.

As described above, in the embodiment of the present invention, if there is a difference between the height position of the upper belt 38 which is fixed by the fixing member 46 and the belt abutment planes 26 of the cylinder tube 14 due to any dimensional error of the end plate 18, the engaging hole 44, the fixing member 46, the upper belt 38 or the like, either one or both of the first adjusting screw 66 and the second adjusting screw 68 are rotated. Therefore, the fixing member 46 moves under the swinging action thereof. Thus, the height position of the upper belt 38 is desirably adjusted.

As a result, the height position of the upper belt 38 can be adjusted corresponding to the dimensional error of the respective members. Therefore, the upper belt 38 is not spaced from the belt abutment planes 26 of the cylinder tube 14. The slit 22 can be sealed more reliably by the upper belt 38. Further, the first and second adjusting screws 66, 68 enable the convenient adjustment operation, improving the assembling operability.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A belt-fixing mechanism for fixing a belt for closing a slit of a body of a drive apparatus, said slit extending in an axial direction of a cylinder tube, said belt-fixing mechanism comprising:

a fastening member which is connected to an end of said body;

a fixing member which is inserted into a hole formed in said fastening member and which fixes said belt; and a fixation position-adjusting member which is disposed in said fastening member and which swings said fixing member to adjust a height position at which said belt is fixed, wherein said fixation position-adjusting member includes a plurality of pressing members which are coaxial with said slit and which press said fixing member, and displacement amounts of said pressing members are changeable to swing said fixing member for adjusting said height position of said belt interposed between said fixing member and said pressing member.

2. The belt-fixing mechanism according to claim 1, wherein said pressing members are a plurality of screws which are screwed into holes formed through said fastening member for pressing said fixing member.

3. The belt-fixing mechanism according to claim 1, wherein said fixing member has a flange which engages with a first opening of said fastening member, and a projection which is inserted into a second opening formed continuous with said first opening.

4. The belt-fixing mechanism according to claim 3, wherein a side surface of said projection for abutting against said pressing members has a plurality of first circular arc-shaped sections, and another side surface of said projection opposite to said side surface has a second circular arc-shaped section:

said plurality of first circular arc-shaped sections each having the same radius of curvature and being longitudinally continuous; and said second circular arc-shaped section having a radius of curvature larger than said radius of curvature of each of the first circular arc-shaped sections.

5. The belt-fixing mechanism according to claim 4, wherein a number of said plurality of pressing members corresponds to a number of said first circular arc-shaped sections.

6. The belt-fixing mechanism according to claim 4, wherein an upper belt is fixed between said first circular arc-shaped section of said fixing member and an end of said pressing member, and a lower belt is fixed between said second circular arc-shaped section of said fixing member and a wall surface of said second opening.

7. The belt-fixing mechanism according to claim 2, wherein said plurality of screws comprise a first adjusting screw which abuts against a first upper circular arc-shaped section of said fixing member, and a second adjusting screw which abuts against a second upper circular arc-shaped section of said fixing member.

8. The belt-fixing mechanism according to claim 1, wherein said belt comprises an upper belt which is made of a metal material for closing said slit of a rodless cylinder.

9. The belt-fixing mechanism according to claim 1, wherein said pressing members are screws which are screwed into holes of said fastening member, and a side surface of said fastening member having said holes is parallel to a plane on which a movable element of said drive apparatus moves.

10. The belt-fixing mechanism according to claim 1, wherein said drive apparatus is said rodless cylinder, and said fastening member is a pair of end plates which are connected to both ends of said cylinder tube.

* * * * *